(12) United States Patent
Deane et al.

(10) Patent No.: US 12,504,279 B2
(45) Date of Patent: Dec. 23, 2025

(54) INTERPOSER TOOL FOR SHAFT MEASUREMENT

(71) Applicant: QUALITY VISION INTERNATIONAL INC., Rochester, NY (US)

(72) Inventors: Brian Deane, Rochester, NY (US); Edward T. Polidor, Rochester, NY (US); Will Smith, Marlborough, MA (US)

(73) Assignee: QUALITY VISION INTERNATIONAL INC., Rochester, NY (US)

( * ) Notice: Subject to any disclaimer, the term of this patent is extended or adjusted under 35 U.S.C. 154(b) by 128 days.

(21) Appl. No.: 18/590,566

(22) Filed: Feb. 28, 2024

(65) Prior Publication Data

US 2025/0271259 A1    Aug. 28, 2025

(51) Int. Cl.
*G01B 11/30* (2006.01)
*H04N 23/56* (2023.01)
*H04N 25/701* (2023.01)

(52) U.S. Cl.
CPC .......... *G01B 11/30* (2013.01); *H04N 23/56* (2023.01); *H04N 25/701* (2023.01)

(58) Field of Classification Search
CPC ....... G01B 11/30; H04N 23/56; H04N 25/701
See application file for complete search history.

(56) References Cited

U.S. PATENT DOCUMENTS

| | | | |
|---|---|---|---|
| 5,133,601 A * | 7/1992 | Cohen | G01B 11/2441 356/600 |
| 5,615,489 A | 4/1997 | Breyer et al. | |
| 9,097,612 B2 * | 8/2015 | Kulawiec | G01M 11/025 |
| 9,599,456 B2 | 3/2017 | Christoph et al. | |
| 9,784,564 B2 | 10/2017 | Schwab et al. | |
| 10,107,615 B2 | 10/2018 | Kay | |
| 10,701,259 B2 | 6/2020 | Bloch | |
| 2013/0300861 A1 | 11/2013 | Neumann et al. | |
| 2023/0003510 A1 | 1/2023 | Morii et al. | |
| 2023/0064860 A1 | 3/2023 | Matusu et al. | |

FOREIGN PATENT DOCUMENTS

WO    2011064339 A2    6/2011

OTHER PUBLICATIONS

Nugent, Patrick. "How to Choose the Best Shaft Measurement Tool for your Specific Application." Quality Magazine, Jun. 7, 2021, https://www.qualitymag.com/articles/96550-how-to-choose-the-best-shaft-measurement-tool-for-your-specific-application.

Vicvision "Unbeatable performance with optical and tactile combination", accessed Aug. 8, 2024, https://www.vicvision.com/optical-and-touch-probe-combination-shaft-measuring/.

* cited by examiner

*Primary Examiner* — Seung C Sohn
(74) *Attorney, Agent, or Firm* — Jodi A. Reynolds, Esq.; Harter Secrest & Emery LLP

(57) ABSTRACT

An apparatus for an optical based measurement machine for measuring a surface of a workpiece fixed to a rotational axis for rotation about the rotational axis, the apparatus comprising a probe configured for movement traverse to the rotational axis, the probe further configured to contact the surface of the workpiece in rotation about the rotational axis, an optical system imaging an illuminated profile of the probe, wherein the illuminated profile of the probe varies along the direction of the rotational axis.

26 Claims, 10 Drawing Sheets

INTERPOSER TOOL FOR SHAFT MEASUREMENT

BACKGROUND OF THE INVENTION

Field of the Invention

The invention relates to the field of optical metrology, and in particular to an interposer within an optical imaging system having a rotational axis to mount a workpiece to be measured and a second axis having an imaging system, the interposer configured to measure surfaces on the workpiece that are generally perpendicular to the rotational axis through optical detection of the interposer.

Description of Related Art

Precision optical measuring instruments gather metrological data from workpieces. Examples of precision optical measuring instruments include the video measurement machines described in U.S. Pat. Nos. 9,784,564, 10,107,615, and 10,701,259, which teach various aspects of such video measurement machines and are hereby incorporated herein by reference in their entirety. Typically, precision optical measuring instruments include a first rotational axis for affixing the workpiece to be measured by using rotational centers or by using a clamping mechanism, and, a second linear axis which holds an imaging system with a camera. When the linear axis is moved, an image of the workpiece to be measured is generated. Alternatively, the linear axis can be fixed and the rotational axis can spin the workpiece while the imaging system is measuring the workpiece. This allows for measurements of any surfaces that can be imaged with a profile view.

A profile view of an image, however, provides little information about the surfaces that are generally perpendicular to the rotational axis. In certain applications, however, the runout, or total variation of the reference surface of the workpiece when the workpiece is rotated along the rotational axis needs to be known. Thus, optical measuring instruments are traditionally made with a touch probe which is used as a secondary measurement aid. Typically, the touch probe includes a touch sensor comprising a stylus. An exemplary touch probe is that which is available under the tradename Renishaw™ (Renishaw Inc., West Dundee, Illinois, USA). Touch probes include touch scanning sensors that contact the surface of an object along a preselected path, and touch trigger sensors that contact the surface of the object at multiple points. The optical measuring instrument records the position of the touch probe as a point on the workpiece being measured. Generally, touch sensors may be used to measure features or contours of surfaces that are not easily accessible by the optical sensor, such as internal bores or threaded portions, by making repeated contact with the workpiece. Traditionally, the touch probe needs to be calibrated to the primary optical sensor coordinate system and introduces system synchronization issues.

Many alternative designs have been proposed to obviate the calibration and synchronization issues of touch probes. In U.S. Pat. No. 9,599,456 to Ralf et al., a tactile, optical measuring method is described which detects the three-dimensional position of a sphere.

It is desirable to provide an interposer that employs a simple system to determine a one-dimensional position of an interposer, while fixing the other two dimensions.

BRIEF SUMMARY OF THE INVENTION

The invention contemplates an apparatus for an optical based measurement machine for a workpiece fixed to a rotational axis. According to one approach, an apparatus for an optical based measurement machine for measuring a surface of a workpiece fixed to a rotational axis for rotation about the rotational axis is provided, the apparatus comprising a probe configured for movement traverse to the rotational axis, the probe further configured to contact the surface of the workpiece in rotation about the rotational axis, and, an optical system imaging an illuminated profile of the probe, wherein the illuminated profile of the probe varies along the direction of the rotational axis. In one configuration, a geometry of the probe varies along the rotational axis. The geometry comprises, in a configuration, one of a planar surface or a curved surface. The probe can include a contact surface point contacting the surface of the workpiece.

In another configuration, an apparatus for an optical based measurement machine for measuring a first surface of a workpiece fixed to a rotational axis comprises an arm, a first probe connected to the arm, wherein the first probe includes a detection zone, and, a contact surface point for directly contacting the first surface of a workpiece, and, an optical sensor configured to image at least a portion of the detection zone of the first probe to detect a displacement of the first probe along the direction of the rotational axis as the contact surface point of the first probe maintains contact with the first surface of the workpiece when the workpiece is rotated about a rotational axis. The detection zone of the first probe in one configuration includes a known rate of change of a width of the first probe along the rotational axis. In a configuration, the first probe comprises a tapered body extending from a base portion to an apex for directly contacting the first surface of the workpiece. The tapered body in one configuration includes a slant height having a constant slope profile along the direction of the rotational axis within the detection zone. In certain configurations, the tapered body is a 90-degree cone. The arm can include a first face and a second face, and the first probe can be at least a partially spherical body positioned on the first face of the arm. The contact surface point of the first probe in one configuration is a substantially flat area. In a configuration, the apparatus includes a second probe, wherein the first probe is positioned on a first face at the first end of the arm to measure the first surface, the first surface being substantially parallel to an object plane of the optical based measurement machine and wherein the second probe is positioned on a second face of the first end of the arm to measure a second surface of the workpiece, the second surface substantially parallel to the object plane of the optical based measurement machine. The first probe in a configuration includes a translucent housing containing an illumination source.

In yet another configuration, an optical system for measuring a surface of a workpiece comprises an optical measuring instrument having a rotary system for rotating a workpiece about a rotational axis, a lighting system for illuminating the workpiece, a measurement system for measuring surfaces of the workpiece, a computer, and a device for contacting a first surface of the workpiece, the device having a first probe having a detection zone and a contact surface point for directly contacting the first surface of the workpiece, wherein the measurement system includes an optical sensor configured to image at least a portion of the detection zone to determine a displacement of the first probe as the contact surface point maintains contact with the first surface of the workpiece when the workpiece is rotated about a rotational axis.

The optical sensor of the system in one configuration is a line scan camera in a fixed position within the optical system and wherein the line scan camera images a portion of the detection zone to determine a single dimensional displacement of the first probe. The single dimensional displacement of the first probe in a configuration is a change in width within the detection zone of the first probe. The device further comprises, in one configuration, an arm having a first end and a second end, wherein the first probe is positioned at the first end of the arm, and wherein a second probe is position opposite the first probe, wherein the second probe includes a detection zone and a contact surface point for contacting a second surface of the workpiece. The first probe is a tapered body extending from a base portion to an apex for directly contacting the first surface of the workpiece in one configuration. The optical system can include a backlight for illuminating the workpiece and the device. The first probe includes, in certain configurations, a translucent housing containing an illumination source for illuminating the first probe and for detecting the first probe by the optical sensor. The first probe can in another configuration include a retroreflecting surface for detecting the first probe by the optical sensor.

In yet another configuration, a method of measuring a surface of a workpiece fixed to a rotational axis of an optical based measurement machine comprises rotating a workpiece about a rotational axis of an optical based measurement machine, contacting a first probe with a first surface of the workpiece that is substantially parallel to an object plane of an optical based measurement machine, sensing, by an optical sensor, a change in a dimensional profile of the first probe in an illumination field, and determining a total surface variance of the workpiece based on the dimensional position change of the first probe. The step of sensing the change in the dimensional position of the first probe can further comprise the step of imaging the first probe and the workpiece as the workpiece is rotated about the rotational axis of the optical based measurement machine. The step of determining the total surface variation of the workpiece based on the dimensional position change of the first probe can include the steps of measuring a maximum width and a minimum width of the first probe in an image, and, subtracting the minimum width of the first probe from the maximum width of the first probe in the image to determine a rate of change of displacement of the first probe. The step of determining the total surface variation of the workpiece based on the dimensional position change of the first probe can include the step of correlating the rate of change of displacement of the first probe to two times the displacement when the first probe is a 90-degree cone. The method can further comprise the step of determining whether the workpiece is within acceptable tolerances based on the total surface variation.

BRIEF DESCRIPTION OF THE SEVERAL VIEWS OF THE DRAWING(S)

DETAILED DESCRIPTION OF THE INVENTION

At the outset, it should be appreciated that like reference numbers are intended to identify the same structural elements, portions, or surfaces consistently throughout the several drawing figures, as such element, portions or surfaces may be further desired or explained by the entire written specification, of which this detailed description is an integral part. Unless otherwise indicated, the drawings are intended to be read together with the specification, and are to be considered a portion of the entire written description of this invention.

Figure 1:
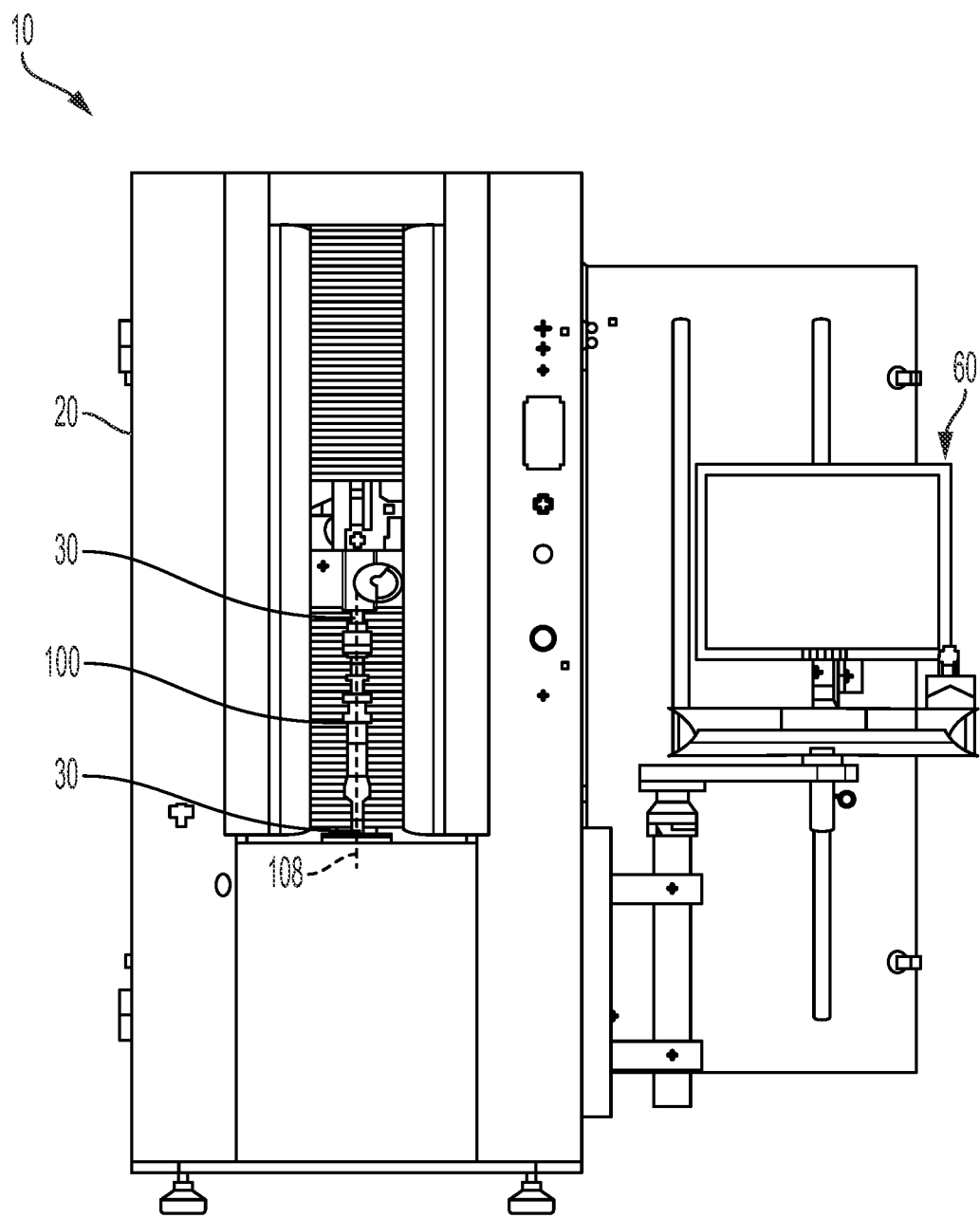
FIG. 1 is a front view of an exemplary optical measuring instrument having a rotational axis.
Figure 2:
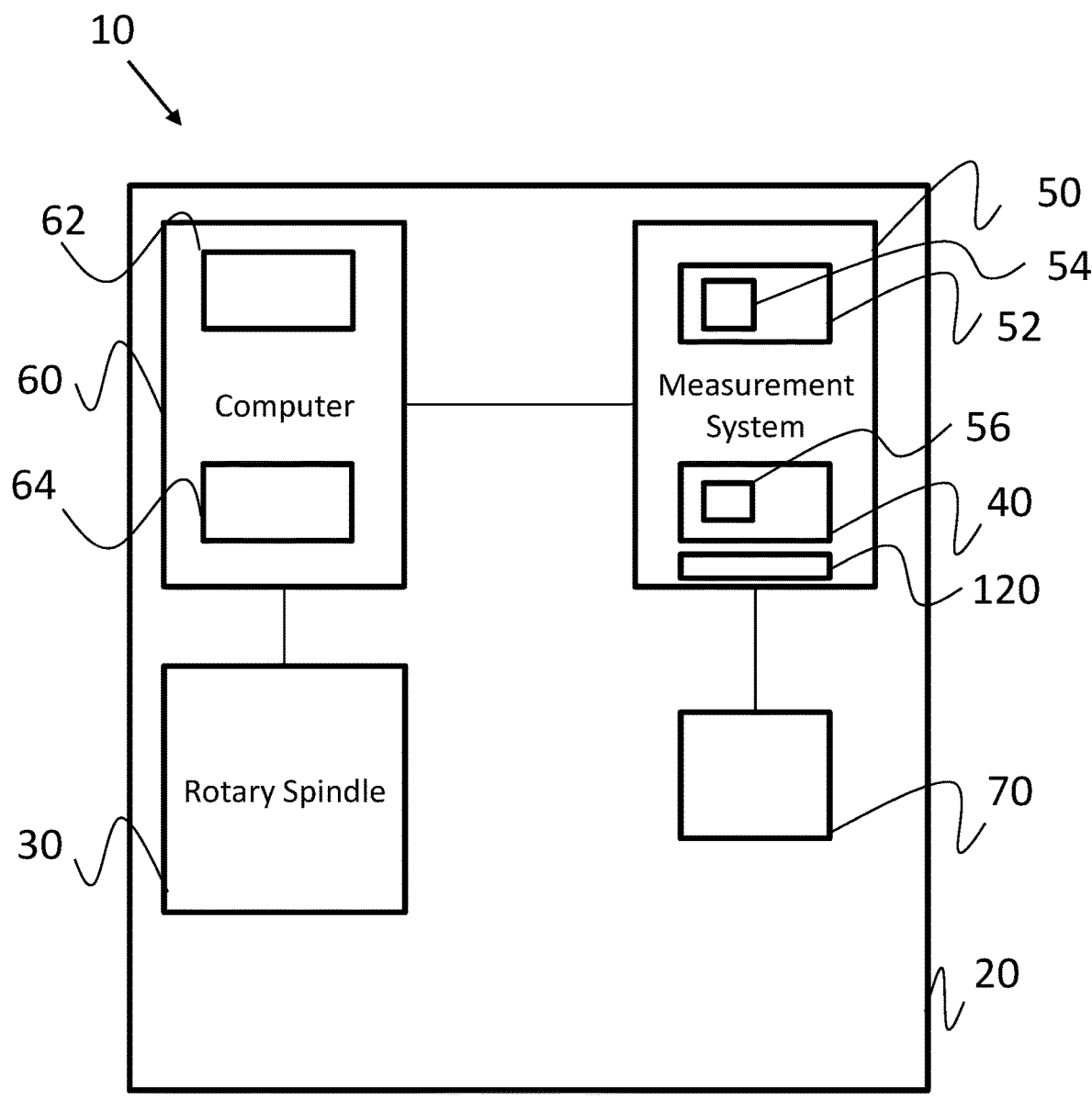
FIG. 2 is a schematic representation of an exemplary optical measuring instrument showing certain features.

An exemplary optical measuring instrument or optical system 10 shown in FIGS. 1-2 generally includes a housing 20 comprising a rotary spindle 30, a lighting system 40, a measurement system 50, a computer 60 having an instrument control system 62 and a data processing system 64. The rotary spindle 30 is configured to rotate a workpiece 100 along a rotational axis 108. The optical measuring instrument 10 can quickly measure and analyze the topology of the workpiece 100, typically, shaft workpieces, although other types of workpieces are possible. The computer 60 can process captured video images and can measure image contrast, image size, and image alignment. The measurement system 50 can include an imaging system 52 along a linear axis having an optical sensor 54, such as a line scan camera, for imaging the workpiece 100 and a light source 56. The imaging system 52 in one configuration is coupled to a slide to move the imaging system 52 traverse to the rotational axis 108, for example, along a vertical axis according to certain optical systems 10. In certain configurations, the optical sensor 54 is on one side of the workpiece 100, and a light source 56 is on the other side of the workpiece 100 such that the workpiece 100 is backlit. An actuator 70 moves the optical sensor 54 or the measuring system 50 along a y-axis, which is typically parallel to the rotational axis 108, and an image of the workpiece 100 is generated. Alternatively, or additionally, the measuring system 50 or the line scan camera can be maintained at a fixed position within the optical measuring instrument 10 while the workpiece 100 is rotated along the rotational axis 108.

Typically, optical shaft measuring instruments 10 can obtain the measurement of certain parameters, including but not limited to measurements of dimensions, shapes and positions. Dimension measurement can include length and diameter, shape measurement can include straightness, roundness, cylindricity, and position measurement can include radial and axial runout, symmetry and parallelism, concentricity and coaxiality. The actuator 70 can be controlled by the computer 60 and alternatively can be manually adjusted for calibration purposes. In one configuration, the light source 56 is a light emitting diode (LED) or a plurality of LEDs. In another configuration, the light source 56 is an incandescent lamp, high intensity discharge (HID) lamp, or superluminescent diode (SLD or SLED).

Figure 3:
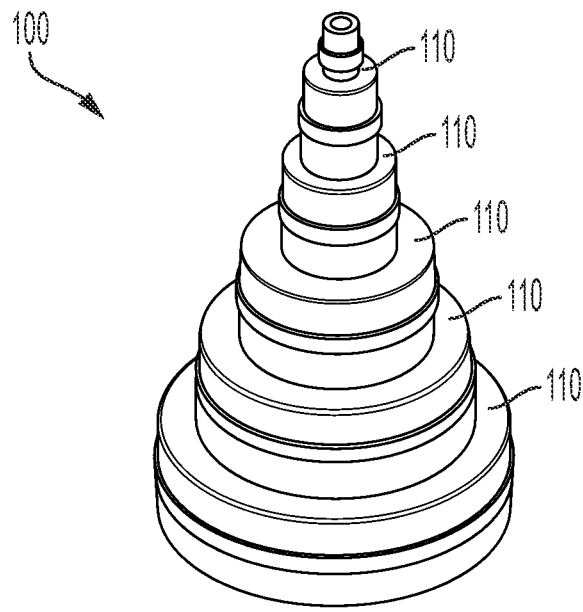
FIG. 3 is a perspective view of an exemplary workpiece having certain surfaces that are parallel to the plane of the rotary face.

An exemplary workpiece 100 that can be measured by the optical measurement instrument 10 is illustrated in FIG. 3. The workpiece 100 to be measured is typically affixed to the rotational axis 108 of the optical measurement instrument 10. The workpiece 100 to be measured can include surfaces 110 that are generally perpendicular to the rotational axis 108 in which the imaging system 52 typically can provide only a small amount of data at most during a linear or rotational scan. Stated differently, surfaces 110 are parallel to the plane of the rotary face of the rotary spindle 30. However, these surfaces 110 can have undulations, declivities, excess material, and variations on runout which require measurement. By "runout" it is meant the surface varies with respect to another datum when the workpiece is rotated 360 degrees around the datum axis. That is, "runout" is the amount of variation on a surface with the rotational axis of the workpiece 100. For parts requiring precision manufacturing, measuring the surface variations of planar surface 110 can determine whether the surface variations are within a predetermined tolerance range as defined by the specifications of the workpiece 100 under test. Further, these surfaces 110 may have additional features or contours that have a desired tolerance range.

Figure 4:
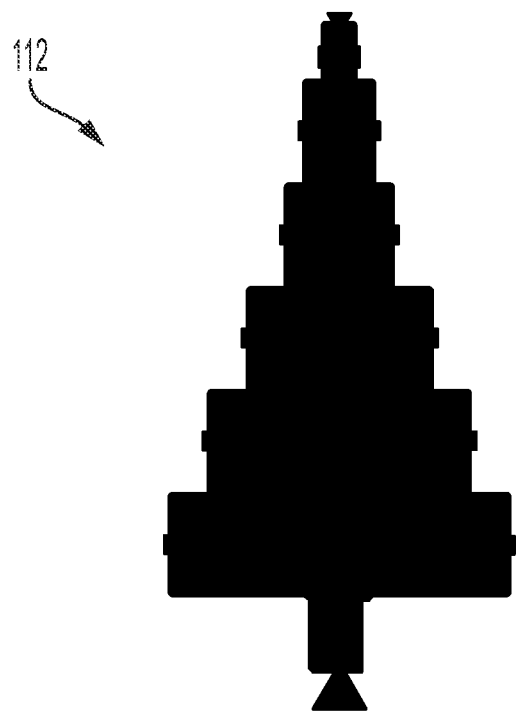
FIG. 4 is a 2-dimensional image of the workpiece of FIG. 3 generated by the optical measuring instrument.

Referring to FIG. 4, an image 112 of the workpiece 100 of FIG. 3 is shown, which was can be generated by the optical measuring instrument 10 to gather metrological data. Typically, this image 112 is generated by "backlighting" the workpiece 100, wherein the workpiece 100 is illuminated from one direction and the workpiece 100 is imaged from the opposite direction. When backlighting a workpiece, the workpiece itself appears dark to the imaging system 52 and the remaining background appears light as shown in FIG. 4. Thus, the workpiece 100 appears in silhouette. The workpiece 100 profile is then identified by the points of transition between light and dark of the two-dimensional image, where the light that surrounds or passes through the workpiece 100 is contrasted with adjacent portion of the view at which light is blocked.

Figure 5:
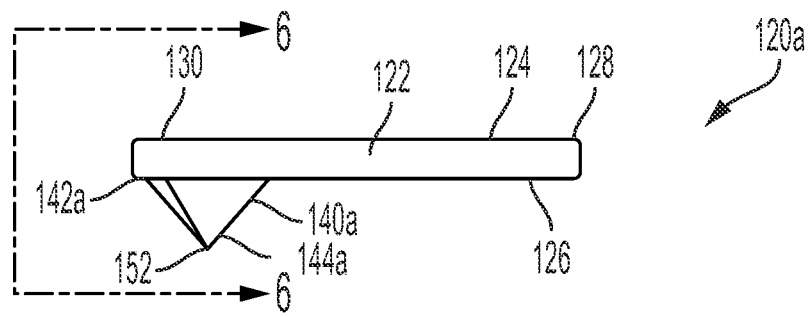
FIG. 5 is a side view of an exemplary embodiment of an interposer device configured to physically contact certain surfaces of the workpiece for determining a surface variation.
Figure 6:
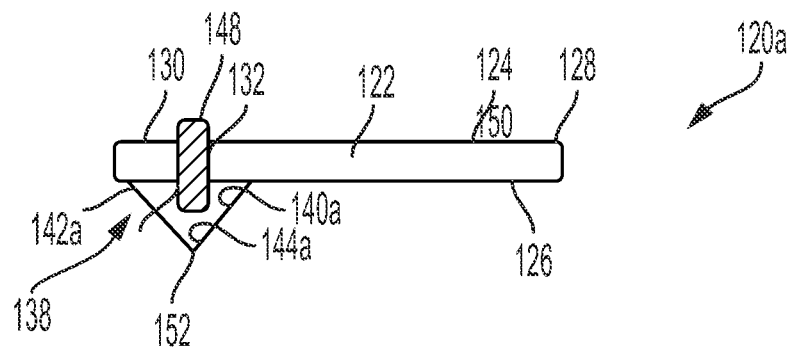
FIG. 6 is a cross-sectional view of the exemplary embodiment of the interposer device shown in FIG. 5 taken along lines 6-6.
Figure 7:
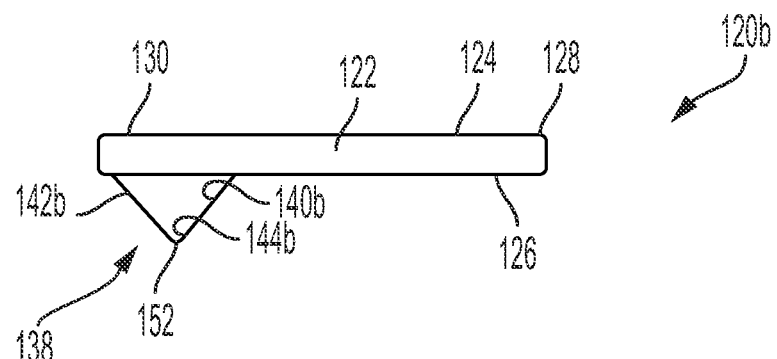
FIG. 7 is a side view of yet another exemplary embodiment of the interposer device configured to physically contact certain surfaces of the workpiece.

Turning now to FIGS. 5-7, an interposer device 120 (shown in FIGS. 5 and 6 as 120a and FIG. 7 as 120b) for incorporating with the optical measuring instrument 10 to gather metrological data of surfaces 110 of a workpiece 100 is shown. The surfaces 110 to be measured by the interposer device 120 are typically substantially perpendicular to the rotational axis 108 (as shown in FIG. 1). The interposer device 120 is sometimes referred to herein as an interposer. In a configuration, the interposer device 120 is configured to measure the axial runout on the surface 110 of the workpiece 100. The interposer device 120 physically contacts the surface 110 to be measured and the optical sensor 54 detects the position of the interposer device 120 during the rotation of the workpiece 100. The measured displacement of the interposer device 120 as it maintains contact with the workpiece 100 through the rotation is directly proportional to the variation on the workpiece surface 110.

The interposer device 120 includes a support arm 122. The support arm 122 is shown having a top face 124, a bottom face 126, a proximate end 128 and a distal end 130, although it should be appreciated that other support arm shapes, sizes and lengths are possible. By proximate end of the arm 122, it is meant the end of the arm 122 that is coupled to the optical measurement instrument 10, for example, a rotary actuator as discussed in more detail below. The support arm 122, in one configuration, is fabricated from shimstock, however, other materials may be used, including but not limited to brass or spring steel. The material of the support arm 122 may be flexible or inflexible, but preferably, the support arm 122 is made of a material that can apply a constant force. The support arm 122 in one configuration has a thickness between approximately 0.010 inches to 0.030 inches, and more preferably between approximately 0.015 inches and 0.025 inches. In one configuration, the support arm 122 is made of shimstock and has a thickness of 0.019 inches. The support arm 122 can have a length of approximately 2 inches to 10 inches, and more preferably between approximately 8 inches and 3 inches and more preferably between approximately 6 inches and 4 inches. The support arm 122 can have a width of approximately 0.25 inches to 4 inches, and more preferably between approximately 0.25 inches and 2 inches, and even more preferably between approximately 0.25 inches and 1 inch. In one configuration, the support arm 122 has a length of approximately 4 inches and a width of approximately 0.50 inches. The support arm 122 can include an aperture 132 through the distal end 130 for securing a probe 140 (140a in FIGS. 5 and 6 and 140b in FIG. 7) to the support arm 122 as discussed below.

Figure 9:
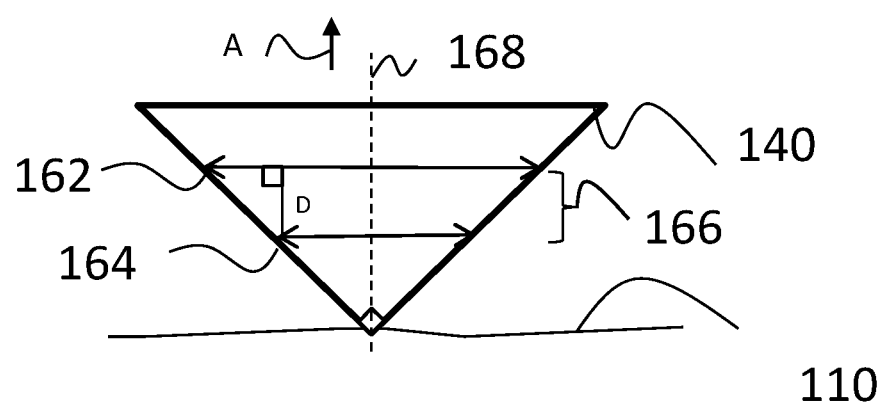
FIG. 9 is a schematic view of the interposer device showing a 90-degree cone as the probe.
Figure 12:
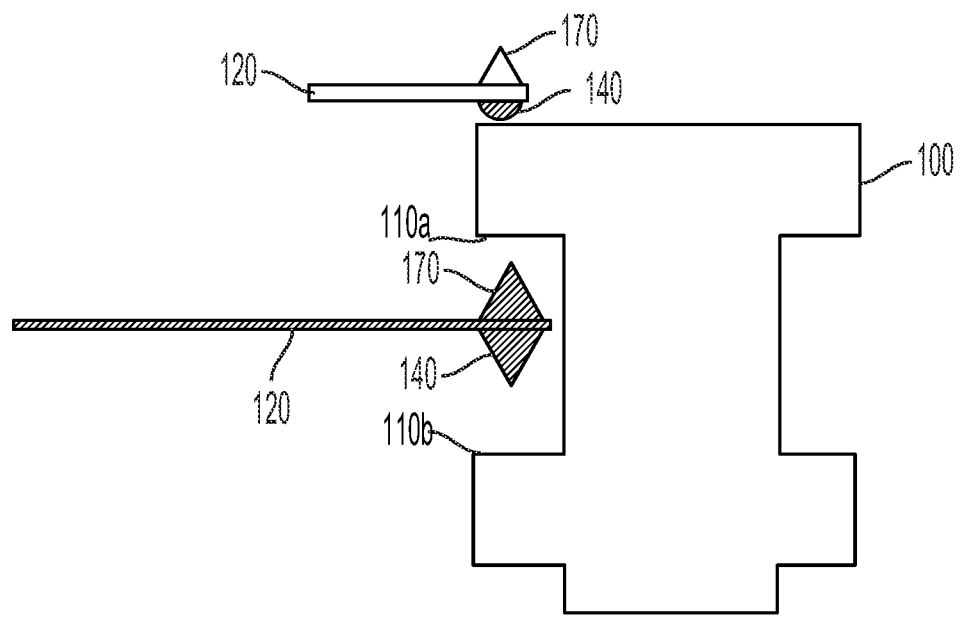
FIG. 12 is a 2-dimensional image of another workpiece having a surface that is parallel to the plane of the rotary face, and a plurality of devices having more than one probe.

The probe 140a or 140b as shown in FIGS. 5-7 includes a tapered body 138 extending from a base portion to an apex. The probe 140a, 140b as shown in FIGS. 5-7 includes a base 142a, 142b and an apex 144a, 144b where the base 142a, 142b is secured to the bottom face 126 of the distal end 130 of the support arm 122. As described in more detail below, the tapered body 138 provides a profile of the probe 140a, 140b that varies along the direction of the rotational axis 108 (direction "A" as shown in FIG. 9). In one configuration, the probe 140a, 140b has a diameter of the base 142a, 142b that is substantially the same as the width of the support arm 122. In a configuration, the diameter of the base 142a, 142b is approximately 0.50 inches and the height is approximately 0.25 inches. However, the diameter of the base 142a, 142b can have a measurement ranging between approximately 0.25 inches to 4 inches, and more preferably between 0.25 inches and 2 inches, and even more preferably between 0.25 inches and 1 inches. The height in alternative configurations can have a measurement ranging between 0.125 inches and 1 inches. The probe 140 includes a curved surface area defined by the base 142a, 142b and the apex 144a, 144b of the probe 140. In a configuration, the probe 140a, 140b is substantially cone-shaped or a substantially conical body with a slant height having a constant slope profile along the direction of the rotational axis "A" as shown in FIG. 9. More specifically, in one configuration, the probe 140a, 140b is a 90-degree cone. In an alternative configuration, the probe is a partial spherical body, or a hemisphere (for example as shown in FIG. 12). The probe 140a, 140b in one configuration is a housing having a bore 146 for receiving a bolt 148. Typically, the bore 146 is vertically threaded for receiving an externally threaded shaft of the bolt 148. The bolt 148 fastens the probe 140 to the support arm 122 when inserting the bolt 148 through the aperture 132 and the bore 146. In an alternative configuration, the probe 140a, 140b is attached to the distal end 130 of the support arm 122 using other attachment methods, including but not limited to glue, rivets, or other adhering polymers. In another configuration, the probe 140a, 140b and the support arm 122 is a one-piece design.

Figure 8:
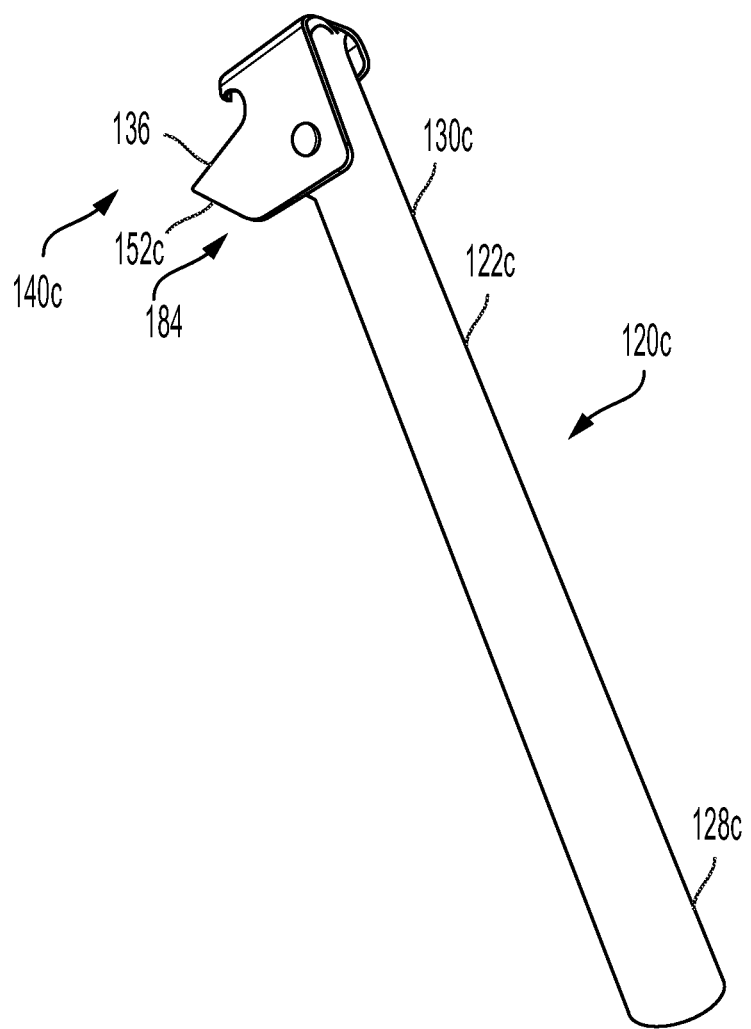
FIG. 8 is a side view of a further exemplary embodiment of the interposer device configured to physically contact certain surfaces of the workpiece.

The probe 140a, 140b includes a contact surface point 152 at the apex 144a, 144b for contacting the surface 110 of the workpiece 100. Thus, the optical sensor 54 detects a displacement of the probe 140a, 140b as it maintains contact with the surface 110 of the workpiece 100 when the workpiece is rotated about the rotational axis 108. The contact surface point 152 in one configuration is rounded or blunt area as shown in FIG. 7. In another configuration, the contact surface point 152 is a point as shown in FIGS. 5 and 6. However, it should be appreciated that other probe geometries and contact surface point configurations can be used and these are intended to be included within the scope of the invention as claimed. For example, as shown in FIG. 8, the interposer device 120c includes a contact surface 184 having a substantially flat plane as discussed in more detailed below. It should be appreciated that the smaller the point, the more surface noise that may be encountered when using the interposer device 120a, 120b, or 120c. It should further be appreciated that the contact force of the interposer device 120a, 120b, or 120c is fairly constant. A deflection, or deflection force, can be set to ensure that the interposer device 120a, 120b, or 120c remains in contact with the workpiece 100, but also is not significant enough to damage the surface of the workpiece 100 being measured. In a configuration, a strain gauge (not shown) is attached to the interposer device 120a, 120b, 120c to set the contact force to the appropriate level when the interposer device 120a, 120b, 120c is being deployed into position, and in preparation of a scan. It should be appreciated by those having ordinary skill in the art that the appropriate contact force can depend on a plurality of factors, including but not limited to the material of the workpiece 100 under test and the material and geometry of the probe 140a, 140b, 140c. The strain gauge may be adhered to the interposer device 120a, 120b, 120c, for example, by glue or other polymers. In addition to measuring the contact force of the interposer device 120a, 120b, 120c, the strain gauge may stop the rotation of the workpiece 100 in the event of unexpected contact or unexpected contact force. Typically, the probe 140a, 140b, 140c is made of metal. In one configuration, the probe 140a, 140b, 140c is made of brass. Preferably, the probe 140a, 140b, 140c is made of a material having a hardness sufficient for withstanding wear during use while not damaging the workpiece 100.

Referring to FIG. 8, an interposer device 120c for incorporating with the optical measuring instrument 10 to gather metrological data of surfaces 110 of a workpiece 100 is shown. In this configuration, the interposer device 120c includes a support arm 122c having a proximate end 128c and a distal end 130c. The support arm 122c in this configuration is rounded, although it should be appreciated that other support arm shapes are possible. The device 120c further includes a probe 140c having a contact surface point 152c and a tapered surface 136. As shown in the figure, in this configuration, the contact surface point 152c is a substantially flat planar surface.

Turning now to FIGS. 9 through 11B, the interposer device 120 is positioned in the optical measuring instrument 10 within in the optical path of the optical sensor 54 such that when the interposer device 120 physically contacts the surface 110, the optical sensor 54 measures the location of the interposer device 120 during rotation of the workpiece 100. That is, the optical sensor 54 images a detection zone 166 of the probe, which is an illuminated profile of the probe 140 wherein the illuminated profile varies along the direction of the rotational axis (as shown in FIG. 9, direction A). The variation of the illuminated profile in one configuration is a variation in width of the probe profile. However, it should be appreciated that other variations may be observed. For example, the variation in the detection zone 166 may be a variation of reflective material, wherein the optical sensor 54 detects a change in variation of the reflective material within the detection zone 166 as the workpiece is rotated. In one configuration, the interposer device 120 moves along substantially the entire surface 110 of the workpiece while the workpiece is rotating. In another configuration, the interposer device 120 moves along a portion of the surface 110 of the workpiece 100 while the workpiece 100 is rotating. In yet another configuration, the interposer device 120 is stationary while the workpiece 100 is rotating. The measured displacement of the interposer device 120 as it maintains contact with the workpiece 100 through the rotation is directly proportional to the variation on the measured workpiece surface 110. That is, the displacement of the interposer device 120 is determined by directly measuring the width of the probe 140 throughout the rotation scan at a fixed optical position. During the rotational scan using the interposer device 120 in the optical path, the area of interest for the measurement is the interposer device 120 itself and in particular within a detection zone 166 of interposer device 120. In certain configurations detection zone 166 of interposer device 120 is the only area of interest for measurement of surface 110. That is, the workpiece surface 110 itself is not directly measured.

Figure 10:
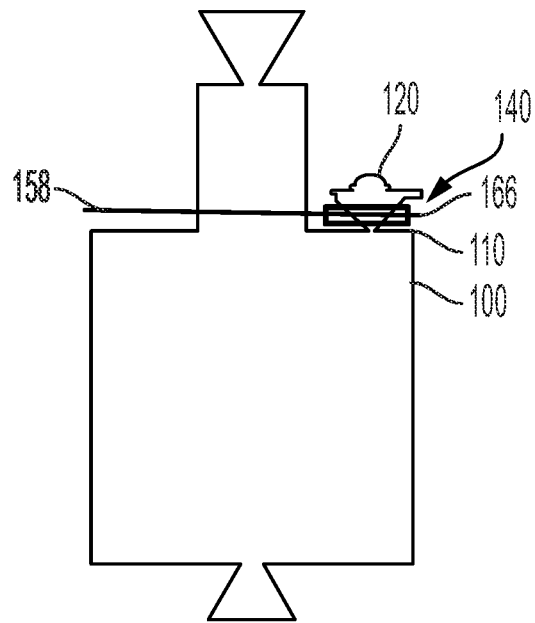
FIG. 10 is a 2-dimensional image of a workpiece and the interposer device for detecting surface variations on certain surfaces of a workpiece.
Figures 11A, 11B:
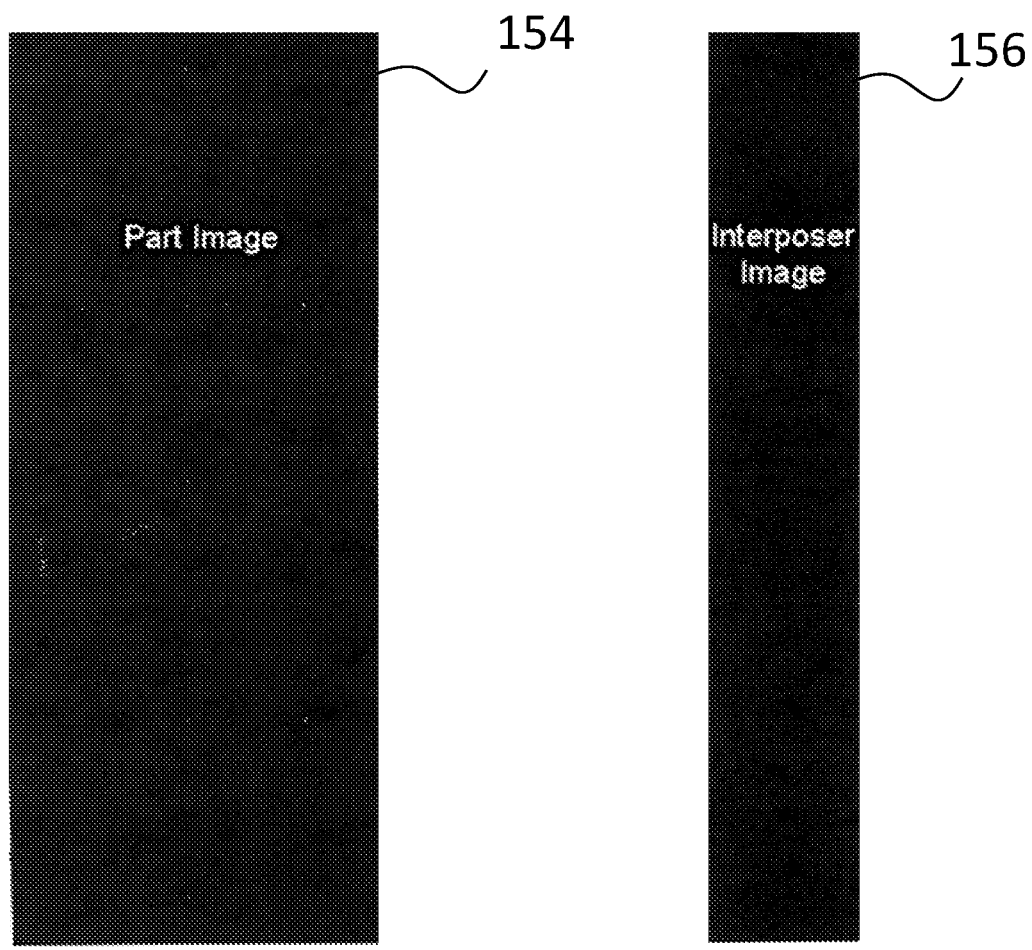
FIG. 11A is a silhouette image of a workpiece taken by an optical sensor of the optical measuring instrument.
FIG. 11B is a silhouette image of a device taken by an optical sensor of the optical measuring instrument.

For example, as shown in FIG. 9, if a surface undulation moves the interposer device 120 along axis 168 in direction A of the arrow, the measured width of the interposer device 120 decreases. If the interposer device 120 moves in the opposite direction due to a declivity, the width of the probe 140 increases. As shown in FIG. 10, the relationship between the interposer device 120, the scan line 158 and the workpiece being measured, and the area of interest during a interposer device 120 scan is shown. When measuring the interposer device 120, the field of view of the imaging slit of the line scan camera producing the scan line 158 typically bisects the axis 168 of the interposer device 120 to provide the maximum range of measurement as the interposer device 120 moves up and down, generally parallel to the rotational axis 108, as the workpiece 100 rotates. The scan data can generate a scan image with two image elements: one image element is of the workpiece surface 110 itself while the other image element is of at least a portion of the detection zone 166 of the interposer device 120. The interposer device 120 image is comprised of individual line scan camera frames that are stitched together throughout the rotational scan. In one configuration, the individual line scan camera frames are generated as the interposer device 120 moves along the planar surface 110 of the workpiece 100 while the workpiece is rotating. An example workpiece surface image 154 and interposer image 156 is set forth in FIGS. 11A and 11B, respectively. As shown in FIGS. 11A and 11B, the workpiece image 154 and the interposer image 156 are each a silhouette image generated from the backlight illumination system 40. It should be appreciated, however, that the interposer 120 can provide the source of illumination. For example, the interposer 120 can include an LED to illuminate a translucent interposer 120. Alternatively, the optical measuring instrument 10 can include a separate illuminator for the interposer 120. For example, an interposer illumination source can be located within an optical assembly housing of the camera. Additionally, the interposer 120 can include a retroreflecting surface to allow the camera to image the interposer 120 without using any back illumination.

Since the interposer device 120 moves with the surface variations of surface 110, while the measurement system 50, such as the imaging system 52 and the lighting system 56, remain fixed throughout measurement, surface information of surface 110 is measured though the processed displacement of the interposer device 120. The optical sensor 54 detects a single dimensional displacement of the probe 140. That is, the variance of a plane defined by the contact area of the surface 110 can be calculated by processing the interposer image 156 through measuring the maximum width of the image 156, corresponding to the maximum width 162 of the probe 140 and subtracting the minimum width of the image 156, corresponding to the minimum width 164 of the probe 140.

In an example configuration, a 90-degree cone was used as the probe 140 which provides a rate of change in width to be two times the displacement such that the result is divided by two. That is, in the event of excess material, the 90-degree cone will be higher and the width of the interposer device 120 will decrease. On the other hand, in the event of a declivity, the 90-degree cone will be lower and the width of the interposer device 120 will increase. The total variation of measurement during a rotational scan, or runout when measured with respect to a referenced datum, can therefore be determined. It should be appreciated that example calculations for a runout measurement provided below depend on the specific geometry employed in the device probe 140. Although a 90-degree cone is described, other geometries can be used including but not limited to larger or smaller degree cones, or a partial sphere or a hemisphere. For example, a cone having an angle ranging from approximately 20 degrees to 160 degrees can be used and more preferably, between approximately 45 degrees and 120 degrees, and even more preferably, approximately 90 degrees. In the example below, a 90-degree cone was used as the probe 140 that contacts the surface 110 and that is being measured. In this case, as shown in FIG. 9, a maximum width 162 and a minimum width 164 of the probe 140 are measured. The minimum width is subtracted from the maximum width. This resulting value is double the total variation of measurement during a rotational scan. Thus, the resulting value is divided by 2 to provide the runout. That is, the following formulas are used:

$$2X = \text{Width max} - \text{Width min}$$

$$D = 1/2(2X)$$

$$D = 1/2(\text{Width max} - \text{Width min})$$

D=Total variation of measurement during rotational scan (equivalent to runout when measured with respect to a reference datum)

In an example configuration where a 90-degree cone is used to determine runout of a surface 110, a maximum width of the probe 140 of 3.230 mm was measured and a minimum width of 3.010 mm of the probe 140 was measured. Subtracting these values provides a value of 0.220 mm. To determine the total variation of measurement during a rotational scan, this number is divided by 2 to equal 0.110 mm. Thus, the runout of such surface 110 is 0.110 mm.

Turing to FIG. 12, it should be appreciated that the interposer device 120 can be configured to measure opposite facing surfaces, for example, surfaces 110a and 110b in FIG. 12. In one configuration, the interposer device 120 includes multiple probes attached to the support arm 122. For example, a second probe 170 can be secured to the opposite face of the distal end 130 of the support arm 122. The second probe 170 may be the same geometry and/or size as the first probe 140 or have an alternative geometry and/or size. Either the first probe 140 or the second probe 170 may be used for measurement. In another configuration, one of the first probe 140 and second probe 170 remains in the optical field of view of the camera while the other one of the probes 140, 170 contacts the surface 110a or 110b during rotation of the workpiece 100. Or, alternately, a single interposer device 120 is rotatable 180 degrees about the axis of the arm 122 to flip it over while keeping the waist of the cone in the same vertical location. Further, the interposer 120 is not limited to 90-degree cones. Different interposer modules are intended to be utilized and can be optimized for different applications. A interposer device 120 having dual probes 140, 170 can be employed to measure planes on up-looking or down-looking planes. Further, it should be appreciated that the optical measuring instrument 10 may include multiple devices 120 for measuring surfaces 110. The interposer device 120 is not limited to the 90-degree cone as the only type of contact point.

Figure 13:
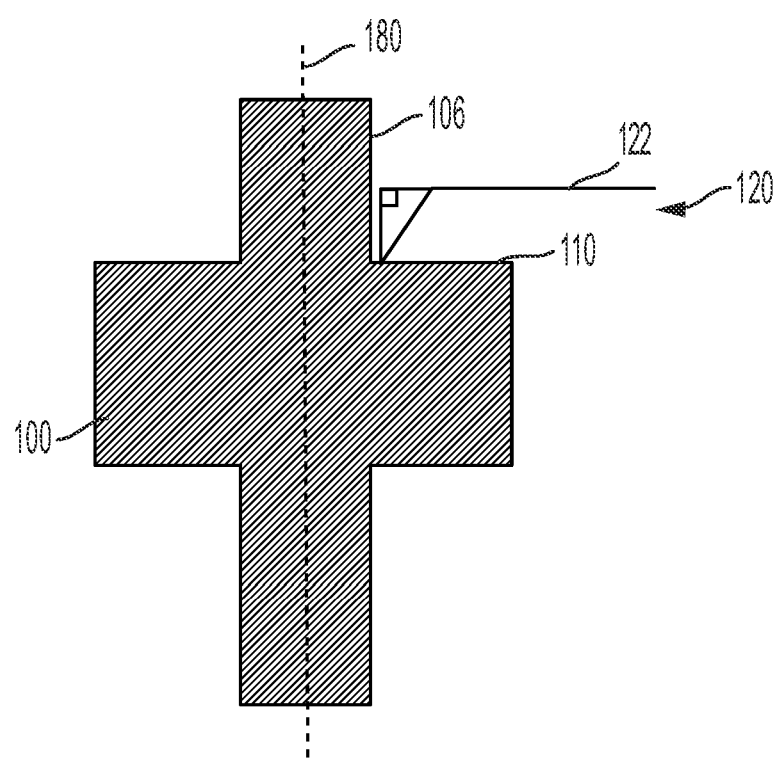
FIG. 13 is a 2-dimensional image of another workpiece having a surface that is parallel to the plane of the rotary face and showing an alternative embodiment of the device.

It should be appreciated that the interposer 120 is not limited to the configurations shown and other configurations are possible. For example, as shown in FIG. 13, the interposer 120 can include a right-angle triangle at the support arm 122 such that straight side, for example, the long-axis, rather than an angled side, is parallel to the workpiece centerline 180 and proximate a sidewall 106 of the workpiece 100. That is, a half-cone interposer 120 can be provided. This presents the ability to measure up to one-hundred percent of the workpiece surface 110 without the interposer device 120 itself impeding the measurement as the interposer device 120 approaches the sidewall 106 of the workpiece 100. Further, the interposer arm 122 can be rotationally deployed on a pivot with the proximal end 128 attached to a rotary actuator (not shown) to actuate the arm 122 into position for measurement. If the actuator is a stepping motor, the displacement of the apex 144 of the interposer 120 from the centerline axis of the workpiece 100 can be calibrated easily during setup. The fully retracted position of the arm 122 can be located from a home position limit switch. This is desirable for system initialization. The length of the arm 122 from the pivot (on the motor) to the axis 168 of the interposer 120 is easily measured. Since the interposer 120 moves on an arc from the home position, each step of the motor generates a predetermined position for the axis 168 of the interposer 120 in relation to the workpiece 100 centerline. In one configuration, the pivot can be the motor shaft itself when this shaft is oriented vertically.

When in use, the interposer 120 in one configuration is coupled with the imaging system 52, for example, on an imaging system slide as they move along the same direction as the rotational axis, for example, along a vertical axis in certain optical systems 10. When not in use, the interposer 120, in one configuration, is docked in a location other than a measurement zone and not moved with the imaging system slide. When in use, one possible location for the interposer 120 is in the front of the machine 10 within the view of a viewing window. In this location, the interposer 120 is easy to access by a user. The pivot, in one configuration, is oriented vertically, and is in a fixed location in relation to the axis of rotation 108 of the rotary motor that turns the workpiece 100. As the interposer arm 122 rotates, the probe 140 contacts the runout surface 110 anywhere in the 50 mm measurement range between the workpiece 100 centerline and the maximum possible workpiece 100 diameter. If the length of the arm 122 is 125 mm from the axis of the probe 140 to the pivot, the angle subtended by the arm 122 is reasonably small when measuring any position in its 50 mm wide swing range. The probe 140 will move through the depth of field of the optical system 10 as the angle of the arm 122 changes because it is swinging on an arc, but the optical depth of field is sufficiently large so the probe 140 will remain reasonable in focus. The interposer 120, in one configuration, is docked when it is not needed for measuring axial runout. The interposer 120 can be docked at the top or the bottom of the slide travel. In certain configurations, there is more space available at the top, but in certain optical systems 10, the slide would need to be translated all the way to the top of travel to pick up the docked interposer 120 and then back down to engage the runout surface 110 on the workpiece 100 for measurement. There is less motion required from the slide if the interposer 120 is docked at the bottom of vertical travel. It can be undesirable to do a scan for measurement when the interposer 120 is attached to the slide. The interposer 120 could interfere with the scan accuracy, interfere with operator safety because the light curtain may need to be bypassed, and the interposer 120 could be in the way in the event of an unexpected machine stop condition.

Whenever the interposer 120 is being deployed, the strain gauge can be monitored for any force from an unexpected contact. In the event of such contact the interposer 120 will retract, and the machine 10 placed in a stopped condition. The recovery, in one configuration, takes the slide to the docked position and detaches the interposer 120 in the dock.

The interposer 120, in one configuration, is deployed to a predetermined radial location that corresponds to a predetermined distance from the centerline of the workpiece 100 on the surface 110 where the runout is to be measured. A software program can facilitate the user locating the position of the vertical slide of the optical sensor 54 and the interposer angle, so the probe 140 in the optical field of view is bisected and at the proper radial location when the strain gauge indicates sufficient contact force is applied to the runout surface. The software program can direct movement of the slide to a position where the interposer 120 is sufficiently away from the surface (above or below) so the interposer 120 can be safely deployed radially to the preselected location. Then the slide can move slowly in the proper direction to contact the surface 110 at the predetermined location on the workpiece 100. This motion is stopped when the contact force measured by the strain gauge is at a preselected value, which may depend on certain factors, including but not limited to, the material of the arm 122 and the geometry of the probe 140. Beforehand, the software program could change how a single probe 140 is oriented by rotating the arm 122 or it could use a second probe 170 if available at the end of the arm 122 facing oppositely. In the two probe configuration, the software program would adjust for the known distance from the apex of one of the probes, probe 140 or 170, to the center of the measuring probe, probe 140 or 170, which is the measuring probe that always remains in the optical field of view to measure the amount runout regardless of which probe 140, 170 is contacting the surface 110. The workpiece 100 being measured is then rotated about its axis at least two full revolutions to provided data to calculate the runout using the known measuring probe 140 geometry predefined in the software. At the completion of the workpiece 100 rotation, the interposer 120 is retracted to the home position so another measurement can be made. As stated above, the interposer 120 is not limited to a cone configuration and other configurations are possible. A user may wish to select from any number of different interposers with differing geometries and/or sizes and the software program can be configurated to allow for a determination of the runout based on those geometries and/or sizes. A "characteristics file" can be included with the software program to provide various parameters corresponding to the geometry and/or size of the probe(s) 140, 170 and permit alternative configurations of the interposer 120 to be used and considered in the calculations. For simplicity, there may be rules governing the length of the arm 120 so the distance from the pivot to the contact point of the interposer 120 is a constant regardless of the shape of the interposer 120. Additionally, or alternatively, the position of the interposer contact point in relation to the centerline of the rotary axis 108 of the machine 10 can be a calibrated parameter.

Figure 14:
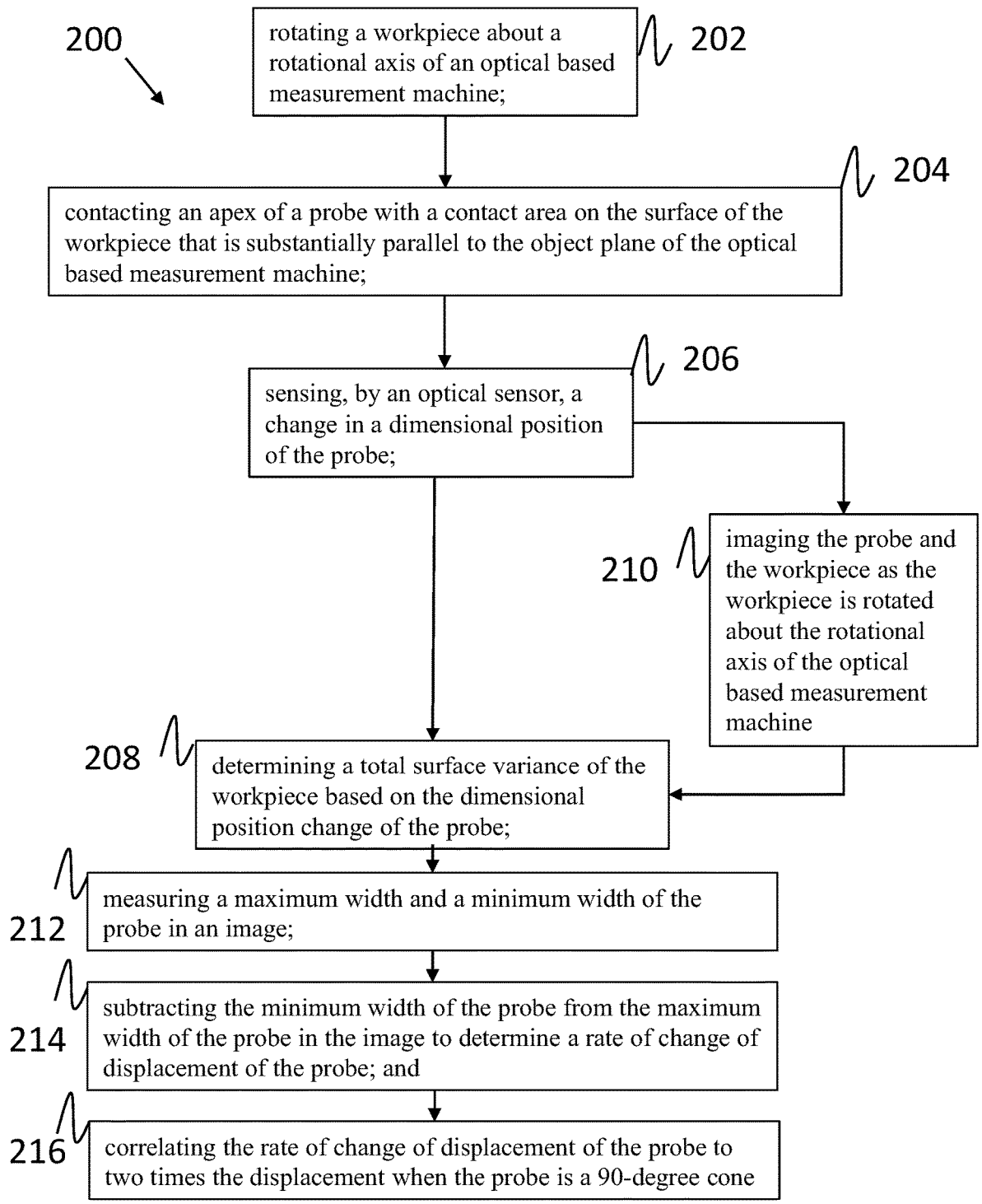
FIG. 14 is a flow diagram disclosing a method of the present invention.

A further configuration, as shown in FIG. 14 includes a method 200 of measuring a surface of a workpiece 100 fixed to a rotational axis 108 of an optical based measurement machine 10. According to step 202, the first step includes rotating a workpiece 100 about a rotational axis 108 of an optical based measurement machine. The next step according to step 204 includes contacting an apex 144 of a probe 140, which may be substantially conical shaped, with a contact area 152 on the surface 110 of the workpiece 100 that is substantially parallel to the object plane of the optical based measurement machine 10. Typically, the apex 144 continuously contacts the contact area 152 on the surface 110 of the workpiece 100 as the workpiece 100 rotates. Next, according to step 206, the step includes sensing, by an optical sensor 54, a change in a dimensional position of the probe 140. According to step 208, the next step includes determining a total surface variance of the workpiece 100 based on the dimensional position change of the probe 140. Step 206 of sensing, by an optical sensor 54, a change in the dimensional position of the probe 140 can further comprise the step 210 of imaging the probe 140 and the workpiece 100 as the workpiece 100 is rotated about the rotational axis 108 of the optical based measurement machine 10. Further, the step of 208 of determining a surface variation of the workpiece 100 based on the dimensional position change of the probe 140 can further include step 212 of measuring a maximum width 162 and a minimum width 164 of the probe 140 in an image, and then the step of 214 of subtracting the minimum width 164 of the probe 140 from the maximum width 162 of the probe 140 in the image to determine a rate of change of displacement of the probe 140. The step of determining a surface variation of the workpiece 100 based on the dimensional position change of the probe 208 can include the step of 216 of correlating the rate of change of displacement of the probe 140 to two times the displacement when the probe 140 is a 90-degree conc.

Although the optical measuring instrument 10 is shown, it should be appreciated that the interposer device 120 can be included with other types of optical measuring instruments and these modifications are intended to be included within the spirit and scope of the invention as claimed. An example optical system 10 which can include the interposer device 120 is the OGP TurnCheck™ sold by Quality Vision International Inc. Another example optical system 10 which can include the interposer device 120 is the high-performance optical shaft measuring machine OptiShaft™ Systems sold by Adcole, LLC. Moreover, the interposer device 120 can be used to measure any type of workpiece having a surface that is perpendicular to the rotational axis in which the imaging system itself typically can provide only a small amount of data during a linear or rotational scan and is not limited to shaft workpieces. Use of the interposer 120 precludes the need for any active sensor other than the system optical sensor 54, for example, a line scan camera, to make runout measurements. The interposer 120 can be implemented as an entirely manual system where deployment and retraction of the interposer 120 and its positioning in relation to the rotational axis 108 are controlled manually. In such a configuration, the user could utilize a control panel to set the position relative to the rotational axis 108, the orientation of the interposer 120, and, the arm 122 position, which may be a pivot arm. Alternatively, these functions could be automatically or semi-automatically controlled, possibly at the firmware level, to preclude the need for complicated software programing.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

The invention claimed is:

1. An apparatus for an optical based measurement machine for measuring a surface of a workpiece fixed to a rotational axis for rotation about the rotational axis, the apparatus comprising:
a probe configured for movement traverse to the rotational axis, the probe further configured to contact the surface of the workpiece in rotation about the rotational axis; and
an optical system imaging an illuminated profile of the probe, wherein the illuminated profile of the probe varies along the direction of the rotational axis.

2. The apparatus of claim 1, wherein a geometry of the probe varies along the rotational axis.

3. The apparatus of claim 1, wherein the geometry includes one of a planar surface or a curved surface.

4. The apparatus of claim 1, wherein the probe includes a contact surface point contacting the surface of the workpiece.

5. An apparatus for an optical based measurement machine for measuring a first surface of a workpiece fixed to a rotational axis, the apparatus comprising:
an arm;
a first probe connected to the arm, wherein the first probe includes a detection zone, and, a contact surface point for directly contacting the first surface of a workpiece; and
an optical sensor configured to image at least a portion of the detection zone of the first probe to detect a displacement of the first probe along the direction of the rotational axis as the contact surface point of the first probe maintains contact with the first surface of the workpiece when the workpiece is rotated about a rotational axis.

6. The apparatus of claim 5, wherein the detection zone of the first probe includes a known rate of change of a width of the first probe along the rotational axis.

7. The apparatus of claim 5, wherein the first probe comprises a tapered body extending from a base portion to an apex for directly contacting the first surface of the workpiece.

8. The apparatus of claim 7, wherein the tapered body includes a slant height having a constant slope profile along the direction of the rotational axis within the detection zone.

9. The apparatus of claim 7, wherein the tapered body is a 90-degree cone.

10. The apparatus of claim 1, wherein the arm includes a first face and a second face, and wherein the first probe is at least a partially spherical body positioned on the first face of the arm.

11. The apparatus of claim 1, wherein the contact surface point of the first probe is a substantially flat area.

12. The apparatus of claim 1, further comprising a second probe, wherein the first probe is positioned on a first face at the first end of the arm to measure the first surface, the first surface being substantially parallel to an object plane of the optical based measurement machine and wherein the second probe is positioned on a second face of the first end of the arm to measure a second surface of the workpiece, the second surface substantially parallel to the object plane of the optical based measurement machine.

13. The apparatus of claim 1, wherein the first probe includes a translucent housing containing an illumination source.

14. An optical system for measuring a surface of a workpiece, the system comprising:
an optical measuring instrument having a rotary system for rotating a workpiece about a rotational axis, a lighting system for illuminating the workpiece, a measurement system for measuring surfaces of the workpiece, a computer, and a device for contacting a first surface of the workpiece, the device having a first probe having a detection zone and a contact surface point for directly contacting the first surface of the workpiece, wherein the measurement system includes an optical sensor configured to image at least a portion of the detection zone to determine a displacement of the first probe as the contact surface point maintains contact with the first surface of the workpiece when the workpiece is rotated about a rotational axis.

15. The optical system of claim 14, wherein the optical sensor is a line scan camera in a fixed position within the optical system and wherein the line scan camera images a portion of the detection zone to determine a single dimensional displacement of the first probe.

16. The optical system of claim 15, wherein the single dimensional displacement of the first probe is a change in width within the detection zone of the first probe.

17. The optical system of claim 14, wherein the device further comprises an arm having a first end and a second end, wherein the first probe is positioned at the first end of the arm, and wherein a second probe is position opposite the first probe, wherein the second probe includes a detection zone and a contact surface point for contacting a second surface of the workpiece.

18. The optical system of claim 14, wherein the first probe is a tapered body extending from a base portion to an apex for directly contacting the first surface of the workpiece.

19. The optical system of claim 14, wherein the optical system includes a backlight for illuminating the workpiece and the device.

20. The optical system of claim 14, wherein the first probe includes a translucent housing containing an illumination source for illuminating the first probe and for detecting the first probe by the optical sensor.

21. The optical system of claim 14, wherein the first probe includes a retroreflecting surface for detecting the first probe by the optical sensor.

22. A method of measuring a surface of a workpiece fixed to a rotational axis of an optical based measurement machine, the method comprising:
   rotating a workpiece about a rotational axis of an optical based measurement machine;
   contacting a first probe with a first surface of the workpiece that is substantially parallel to an object plane of an optical based measurement machine;
   sensing, by an optical sensor, a change in a dimensional profile of the first probe in an illumination field; and
   determining a total surface variance of the workpiece based on the dimensional position change of the first probe.

23. The method of claim 22, wherein the step of sensing the change in the dimensional position of the first probe further comprises the step of imaging the first probe and the workpiece as the workpiece is rotated about the rotational axis of the optical based measurement machine.

24. The method of claim 22, wherein the step of determining the total surface variation of the workpiece based on the dimensional position change of the first probe includes the steps of:
   measuring a maximum width and a minimum width of the first probe in an image; and
   subtracting the minimum width of the first probe from the maximum width of the first probe in the image to determine a rate of change of displacement of the first probe.

25. The method of claim 24, wherein the step of determining the total surface variation of the workpiece based on the dimensional position change of the first probe includes the step of:
   correlating the rate of change of displacement of the first probe to two times the displacement when the first probe is a 90-degree cone.

26. The method of claim 22, further comprising the step of determining whether the workpiece is within acceptable tolerances based on the total surface variation.

* * * * *